(12) United States Patent
Knoell et al.

(10) Patent No.: US 12,259,029 B2
(45) Date of Patent: Mar. 25, 2025

(54) LINEAR ACTUATOR

(71) Applicant: Robert Bosch GmbH, Stuttgart (DE)

(72) Inventors: Reiner Knoell, Burgsinn (DE); Marco Knoell, Burgsinn (DE); Michael Goldbach, Lohr A. Main (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/462,555

(22) Filed: Sep. 7, 2023

(65) Prior Publication Data
US 2024/0117866 A1  Apr. 11, 2024

(30) Foreign Application Priority Data
Oct. 6, 2022  (DE) .................... 10 2022 210 561.3

(51) Int. Cl.
*F16H 25/24* (2006.01)
*F16H 25/20* (2006.01)

(52) U.S. Cl.
CPC ..... *F16H 25/2454* (2013.01); *F16H 25/2021* (2013.01); *F16H 2025/2075* (2013.01)

(58) Field of Classification Search
CPC .. F16H 25/2454; F15B 15/222; F15B 15/227; F15B 15/24; F15B 2015/268
See application file for complete search history.

(56) References Cited

FOREIGN PATENT DOCUMENTS

| CN | 112460095 A | * | 3/2021 | ............ F15B 15/088 |
|---|---|---|---|---|
| DE | 10 2010 012 635 A1 | | 9/2011 | |
| DE | 10 2020 212 703 A1 | | 4/2022 | |
| DE | 20 2022 101 057 U1 | | 4/2022 | |
| WO | 2017/157728 A1 | | 9/2017 | |

* cited by examiner

*Primary Examiner* — Gregory Robert Weber
(74) *Attorney, Agent, or Firm* — Maginot, Moore & Beck LLP

(57) ABSTRACT

A linear actuator has a screw drive having a threaded nut connected to an extension arm tube and a threaded spindle couplable to a motor. A first end of the spindle always projects into the tube and is connected to a piston which partitions an interior space formed by the tube into a first region on the side of the piston opposite to the nut and a second region on the side of the piston facing the nut. The regions are separated in a fluid-tight manner. The spindle is held in position since the nut comprises an annular piston that delimits an annular fluid space between a housing of the linear actuator and the tube in a fluid-tight manner, the hydraulically effective surface of which is the same size as that of the first region. The first region and the annular fluid space are fluidically connected by a switching valve.

10 Claims, 5 Drawing Sheets

LINEAR ACTUATOR

This application claims priority under 35 U.S.C. § 119 to application no. DE 10 2022 210 561.3, filed on 6 Oct. 2022 in Germany, the disclosure of which is incorporated herein by reference in its entirety.

The present disclosure relates to a linear actuator, in particular a linear actuator with a screw drive, which comprises a threaded nut connected to an extension arm tube and a threaded spindle that is coupled or can be coupled to a motor for torque transmission, so that the threaded nut and the extension arm tube can be moved in a linear manner by a rotation of the threaded spindle and, regardless of the position the extension arm tube is in, a first end of the threaded spindle projects into the extension arm tube and is connected to a piston which partitions an interior space formed by means of the extension arm tube into a first region on the side of the piston opposite to the threaded nut and a second region on the side of the piston facing the threaded nut in such a way that the first and the second region are separated from one another in a fluid-tight manner.

BACKGROUND

In linear actuators of the aforementioned design, the provision of a mechanical brake for locking the threaded spindle in order to keep the length of the linear actuator constant, if desired, despite a force acting on the linear actuator is well-known. Appropriate installation space and an associated control have to be provided for such mechanical brakes. In a maximally extended state, the linear actuator has its maximum length, which is in particular measured between two joints disposed on opposite sides of the linear actuator, in particular the centers of said joints. In a maximally retracted state, the linear actuator has its minimum length.

A linear actuator comprising a spindle end support, which is configured as a piston, seals the interior space of the extension arm tube and partitions said space into the first region on the side of the piston opposite to the threaded nut and the second region on the side of the piston facing the threaded nut, is known from DE 10 2020 212 703 A1. A lubricating oil is disposed in the second region to lubricate and/or cool the screw drive which is preferably configured as a planetary screw drive. On its end facing away from the housing and thus adjacent to the first region of the interior space, the extension arm tube comprises a ventilation opening, so that the pressure outside the linear actuator prevails in the first region of the interior space, regardless of the position the extension arm tube is in. The second region of the interior space is partially filled with the lubricating oil and otherwise filled with a gas. The change in volume of the second region can be accommodated by the compressible gas. The fluid-tight piston prevents lubricating oil from escaping the linear actuator. The second region of the interior space is preferably sealed in a fluid-tight manner. With this in mind, it is conceivable that the second region is in fluid exchange connection with the surroundings via a valve, wherein the valve is configured such that it limits the pressure in the second region upward while not allowing fluid to pass through.

Since the second region is enclosed by the housing in a plurality of positions of the extension arm tube, such a valve configuration can only be implemented with a considerable design effort, because connecting the valve requires a flow connection from the second region formed by means of the movable extension arm tube and the housing which is fixed relative to said extension arm tube.

Also known in the prior art are electrically and hydraulically operable linear actuators, in which the threaded nut of the linear actuator is used as a piston for hydraulic relief. The electric motor used to drive the threaded spindle is typically disposed outside the housing of the linear actuator to make it easy to apply hydraulic pressure to the threaded nut, which is embodied as a piston, from both sides.

SUMMARY

The underlying object of the present disclosure is to provide a linear actuator that reduces or eliminates the problems of the prior art. It should in particular be possible to easily hold the threaded spindle in a specific position such that a specific length of the linear actuator is kept constant despite a force acting on the linear actuator.

This object is achieved by a linear actuator according to the disclosure.

Further advantageous embodiments are the subject matter of the disclosure.

Stated more precisely, the object is achieved in that the threaded nut is embodied as a fluid-tight annular piston or comprises a fluid-tight annular piston, that delimits an annular fluid space, which is configured between a housing of the linear actuator and the extension tube in a fluid-tight manner and the hydraulically effective surface of which is the same size as the hydraulically effective surface of the first region, and the first region and the annular fluid space can be fluidically connected to one another by means of a switching valve having an open and a closed position.

Same size hydraulically effective surfaces in particular means that a section perpendicular to the longitudinal axis through the first region has a same surface area as a section perpendicular to the longitudinal axis through the annular fluid space. When the threaded nut is moved with the switching valve open, a pressurized fluid flows directly back and forth between the annular fluid space and the first region. As a result of the same size hydraulically effective surfaces there are no undesirable pressure peaks or cavitation. When the switching valve is closed, no pressurized fluid can flow back and forth between the annular fluid space and the first region via the switching valve. Consequently, the threaded nut is held axially in position with the aid of the pressurized fluid, even if a force acts from the outside on the extension arm tube and the threaded nut. It could be said that a hydraulic brake of the linear actuator is formed by means of the switching valve and the pressurized fluid disposed in the annular fluid space and in the first region. There is therefore no need for any mechanical brake.

To fluidically connect the first region and the annular fluid space, a first pressure relief valve is preferably disposed between the first region and the annular fluid space in terms of flow parallel to the switching valve in such a way that the pressure that can be produced in the first region by means of a pressurized fluid can be limited upward in that the pressurized fluid can be conducted out of the first region into the annular fluid space via the first pressure relief valve.

Using the first pressure relief valve thus makes it possible to successfully prevent the occurrence of too high a pressure in the first region that could damage adjacent components, such as seals. Fluid in particular flows through the first pressure relief valve when the switching valve is closed.

To fluidically connect the annular fluid space and the first region, a second pressure relief valve is further preferably disposed between the annular fluid space and the first region in terms of flow parallel to the switching valve and in particular in terms of flow parallel to the first pressure relief valve in such a way that the pressure that can be produced in the annular fluid space by means of the pressurized fluid can be limited upward in that the pressurized fluid can be conducted out of the annular fluid space into the first region via the second pressure relief valve.

Using the second pressure relief valve thus makes it possible to successfully prevent the occurrence of too high a pressure in the annular fluid space that could damage adjacent components, such as seals. Fluid in particular flows through the second pressure relief valve as well when the switching valve is closed.

According to a further embodiment of the linear actuator, the switching valve, the first pressure relief valve, and in particular the second pressure relief valve, are embodied as a common structural unit with a common valve housing.

The three valves can thus be disposed in a small installation space and can also be connected to the linear actuator quickly and easily. The connection could be accomplished with the aid of hoses, tubing and/or flow channels configured in housing components. In particular the first region formed by means of the movable extension arm tube is connected to the aforementioned common structural unit by means of a, flexible, hose.

Preferably, a braking force which acts on the extension arm tube and the threaded nut in the direction of an end of the extension arm tube facing away from the threaded spindle can be produced by means of the first pressure relief valve as a function of the flow resistance of the first pressure relief valve.

The flow resistance and thus the braking force could be fixed or also adjustable depending on the geometry of the first pressure relief valve. Such a braking force can be achieved when the switching valve is closed. In addition to holding the threaded nut in a specific position, this braking force can be used to prevent moving bodies coupled to the linear actuator from moving too quickly, so that both the moving bodies and the linear actuator itself can be protected from damage.

Further preferably, a braking force which acts on the extension arm tube and the threaded nut in the direction of an end of the threaded spindle facing away from the piston can be produced by means of the second pressure relief valve as a function of the flow resistance of the second pressure relief valve.

The flow resistance and thus the braking force could be fixed or also adjustable depending on the geometry of the second pressure relief valve. Such a braking force can be achieved when the switching valve is closed. In addition to holding the threaded nut in a specific position, this braking force can be used to prevent moving bodies coupled to the linear actuator from moving too quickly, so that both the moving bodies and the linear actuator itself can be protected from damage. The braking forces that can be produced by means of the first and the second pressure relief valve act in opposite directions.

According to a particularly preferred embodiment, the first region of the interior space of the extension arm tube is connected to a pressure accumulator in order to be able to produce a specific relief pressure in the first region by means of the pressure accumulator.

The relief pressure advantageously acts substantially in axial direction on the threaded spindle and/or the piston connected to the threaded spindle. The screw drive can thus be relieved particularly well with respect to forces which act on the screw drive in just this axial direction but opposite to the force produced by means of the relief pressure. Relieving the screw drive allows the linear actuator to be exposed to higher forces from the outside without causing damage to the screw drive. In particular typical damage such as galling can be successfully avoided. The connection of the first region to the pressure accumulator can furthermore be implemented in a structurally simple manner, because, even in a maximally retracted state of the linear actuator, a small part of the extension arm tube still projects out of the housing, wherein the connection is then preferably carried out in this region. In order to be able to compensate the movement of the extension arm tube, the first region is preferably connected to the pressure accumulator by means of a hose.

A first shut-off valve is preferably disposed fluidically between the first region and the pressure accumulator.

A fluidic connection between the first region and the switching valve and between the first region and the first pressure relief valve can further preferably be interrupted by means of this first shut-off valve. The two functions of braking and relieving can thus be carried out separately from one another. Simultaneous braking and relieving would be conceivable as well, in which case the relief pressure in the first region is then limited upward, in particular by the first pressure relief valve.

It can be advantageous if the annular fluid space can preferably be pressurized by means of a pressure source.

The threaded nut can thus also be pressurized to relieve the screw drive. The pressure advantageously acts substantially in axial direction on the threaded nut or the annular piston. The screw drive can thus be relieved particularly well with respect to forces which act on the screw drive in just this axial direction but opposite to the force produced by means of the relief pressure. The connection of the annular fluid space to the pressure source can furthermore also be implemented in a structurally simple manner, because this connection can be made on an outer perimeter of the housing and because there is still no relative movement between the housing and the pressure source during operation of the linear actuator.

A second shut-off valve is preferably disposed fluidically between the annular fluid space and the pressure source.

A fluidic connection between the annular fluid space and the switching valve and between the annular fluid space and the second pressure relief valve can also preferably be interrupted by means of this second shut-off valve. The two functions of braking and relieving can thus be carried out separately from one another. Simultaneous braking and relieving would be conceivable as well, in which case the relief pressure in the annular fluid space is then limited upward, in particular by the second pressure relief valve.

This object is further achieved by a linear actuator according to the disclosure.

Stated more precisely, the object is achieved in that the threaded nut is embodied as a fluid-tight annular piston or comprises a fluid-tight annular piston, that delimits an annular fluid space, which is configured between a housing of the linear actuator and the extension arm tube in a fluid-tight manner, and the first region and the annular fluid space can be fluidically connected to one another by means of a switching valve having an open and a closed position via a reservoir.

The reservoir can then be used to compensate in certain situations in which the hydraulically effective surface of the annular fluid space is not the same size as the hydraulically effective surface of the first region. The reservoir then prevents undesirable pressure peaks or cavitation when the threaded nut is moved with the switching valve open and a pressurized fluid flows back and forth between the annular fluid space and the first region. With this solution to the problem, too, no pressurized fluid can flow back and forth between the annular fluid space and the first region via the switching valve when the switching valve is closed. Consequently, the threaded nut is held axially in position with the aid of the pressurized fluid, even if a force acts from the outside on the extension arm tube and the threaded nut. It could also be said here that a hydraulic brake of the linear actuator is formed by means of the switching valve and the pressurized fluid disposed in the annular fluid space and in the first region, so that there could be no need for any mechanical brake.

In summary, such a linear actuator is suitable for a variety of applications, such as moving parts of an excavator arm or a telescopic handler.

BRIEF DESCRIPTION OF THE DRAWINGS

Preferred embodiments are shown in more detail in the following with reference to the accompanying figures.

FIG. 1b shows a schematic sectional view of the linear actuator of FIG. 1a.

FIG. 2b shows a schematic sectional view of the linear actuator of FIG. 2a.

DETAILED DESCRIPTION

Figure 1A:
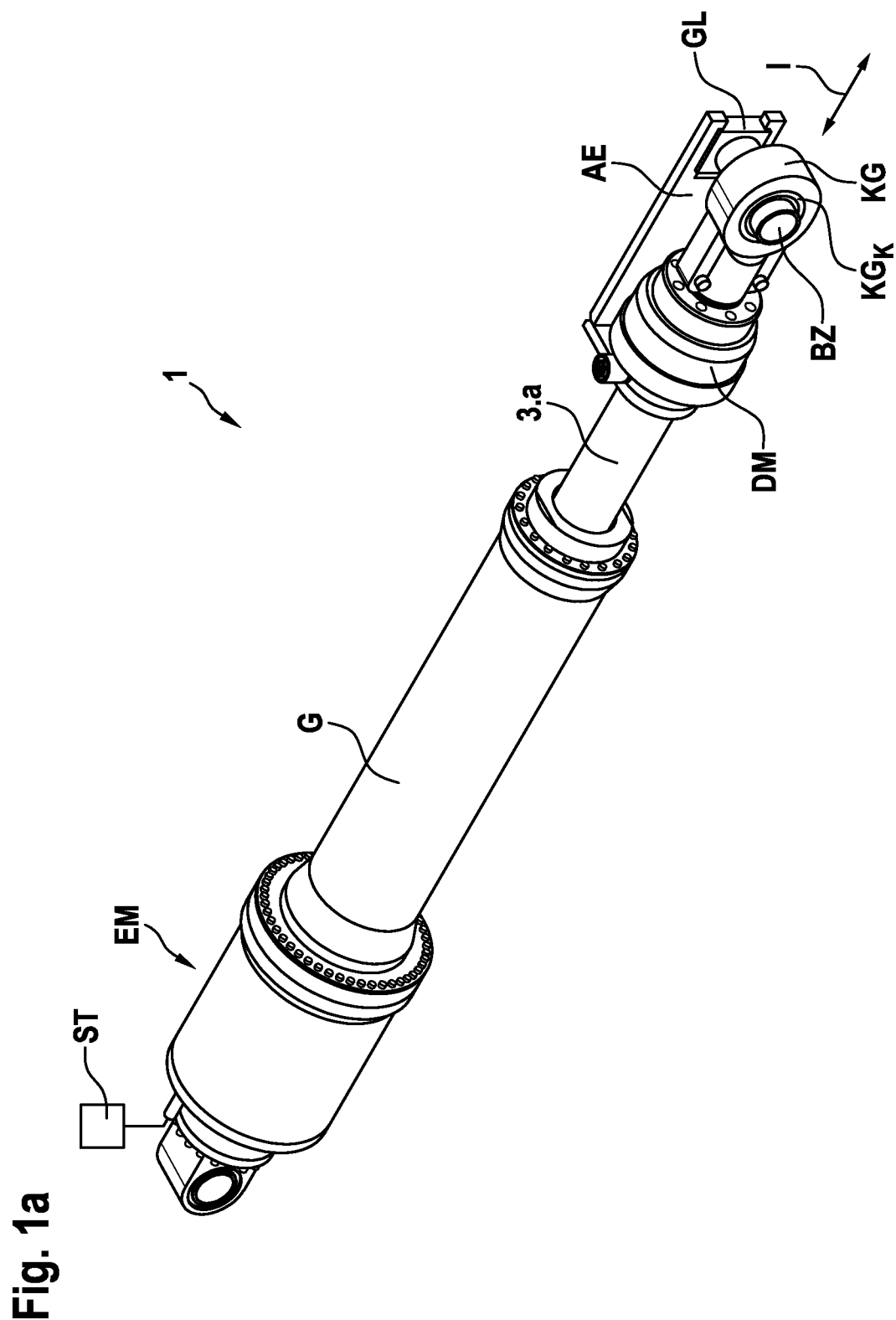
FIG. 1a schematically shows a linear actuator according to a first embodiment of the disclosure in a three-dimensional view.

Among other things, the linear actuator 1 comprises a screw drive 2. The screw drive 2 comprises a threaded nut 3 and a threaded spindle 4. The threaded nut 3 is connected to an extension arm tube 3a. The threaded spindle 4 is coupled or can be coupled to a motor EM for torque transmission, so that the threaded nut 3 and the extension arm tube 3a can be moved in a linear manner by a rotation of the threaded spindle 4. Regardless of the position the extension arm tube 3a is in, a first end of the threaded spindle $4._{E1}$ projects into the extension arm tube 3.a and is connected to a piston K. The second end of the threaded spindle 4 opposite to the first end $4._{E1}$ is labeled as $4._{E2}$. The piston K partitions an interior space IR formed by means of the extension arm tube 3.a into a first region $IR_{B1}$ on the side of the piston K opposite to the threaded nut 3 and a second region $IR_{B2}$ on the side of the piston K facing the threaded nut 3 in such a way that the first and the second region $IR_{B1}$, $IR_{B2}$ are separated from one another in a fluid-tight manner.

On its outer perimeter, the piston K has a groove for receiving at least one sealing ring. The sealing ring, preferably an O-ring or R-ring, makes it possible to seal the sealing gap that forms between the piston K and the extension arm tube 3a particularly well. The end of the extension arm tube 3a facing away from the threaded nut 3 is preferably closed by means of a plug.

The threaded nut 3 is embodied as a fluid-tight annular piston RK or comprises a fluid-tight annular piston RK. The annular piston RK delimits an annular fluid space RR configured between a housing G of the linear actuator 1 and the extension arm tube 3.a in a fluid-tight manner. The hydraulically effective surface of the annular fluid space RR is the same size as the hydraulically effective surface of the first region $IR_{B1}$. The first region $IR_{B1}$ and the annular fluid space RR can be fluidically connected to one another by means of a switching valve SV having an open and a closed position $SV_O$, $SV_G$.

Figure 1B:
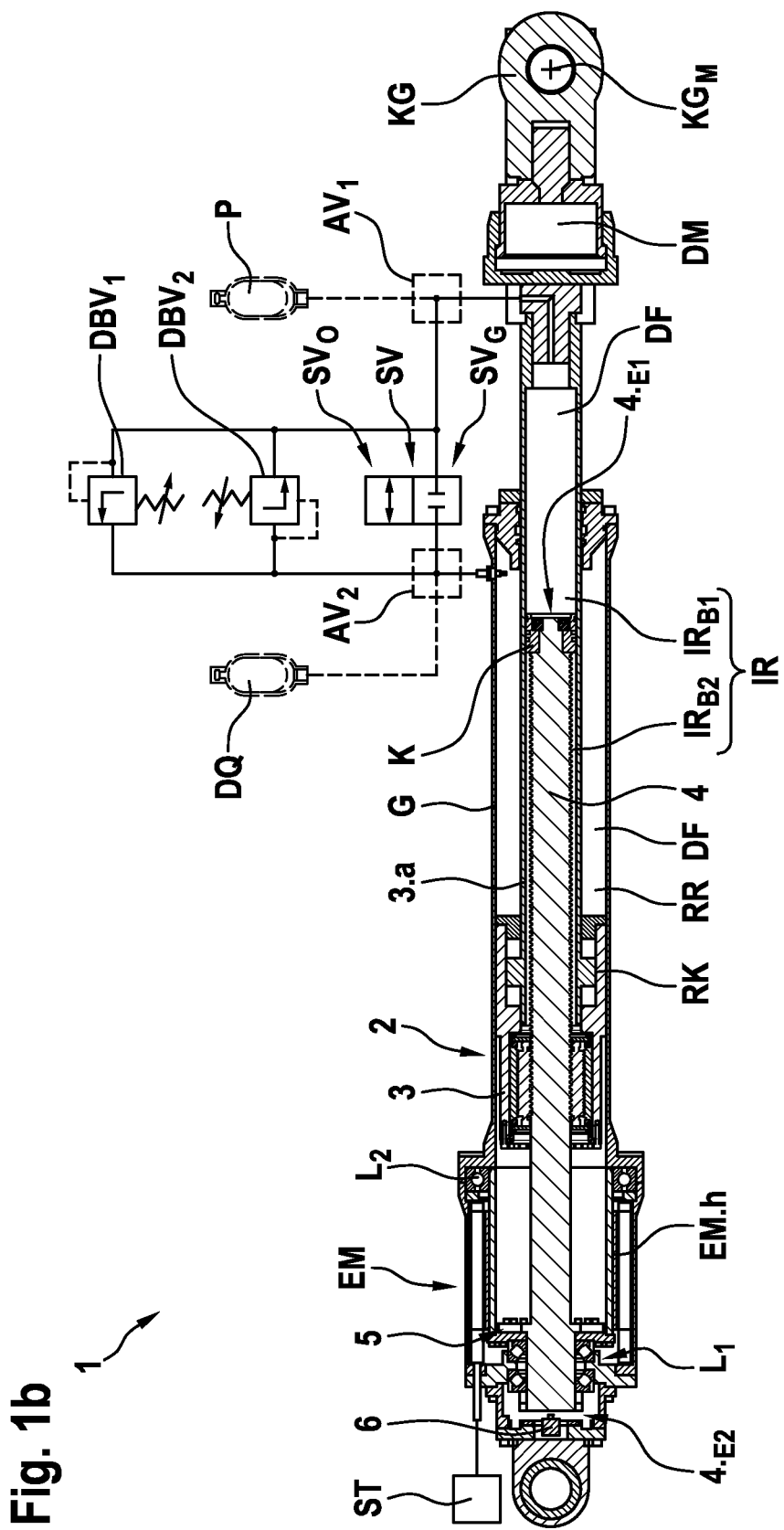
Figure 2A:
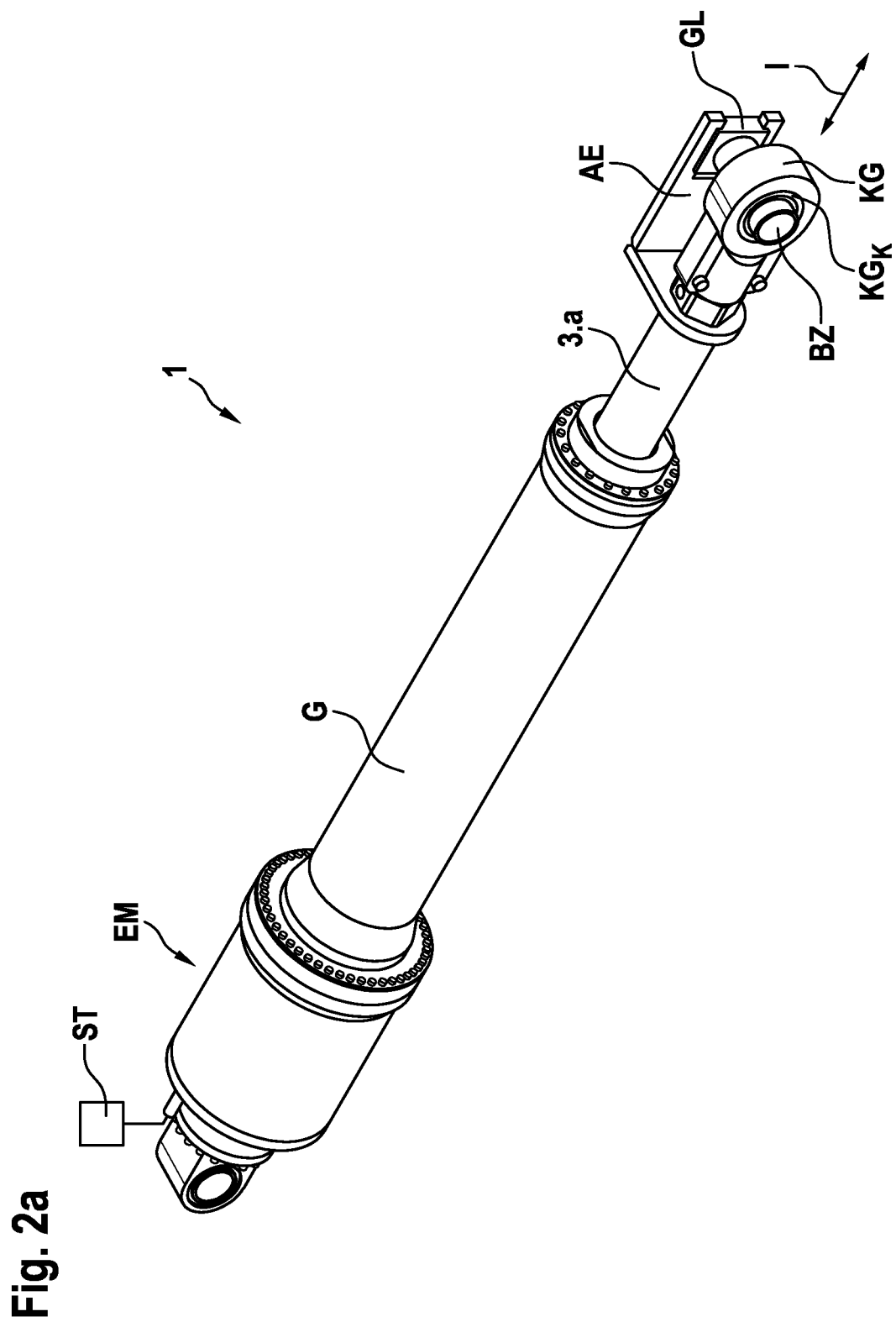
FIG. 2a schematically shows a linear actuator according to a second embodiment of the disclosure in a three-dimensional view.
Figure 2B:
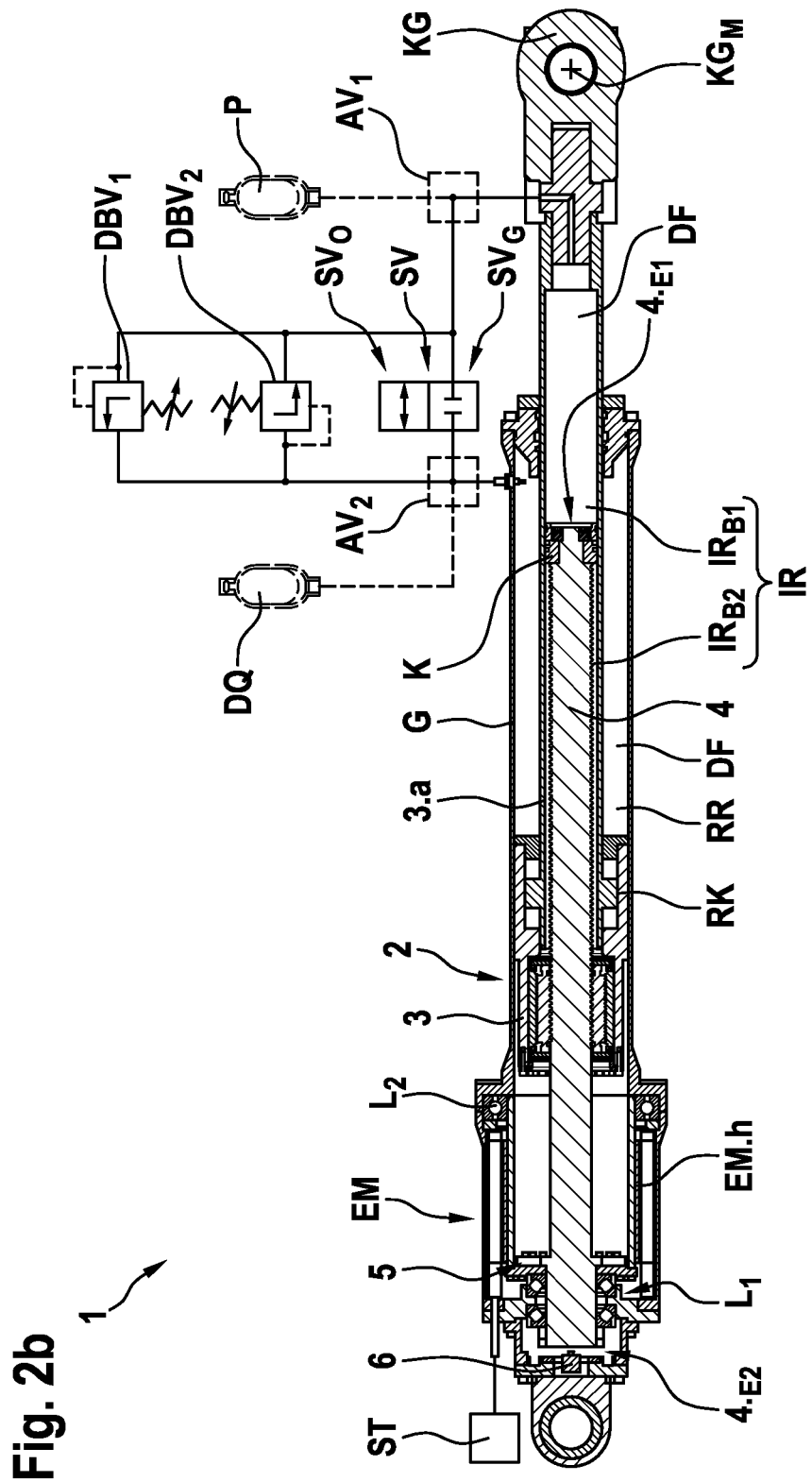

The annular piston RK and the switching valve SV are shown in FIG. 1b and FIG. 2b. For the sake of clarity, FIG. 1a, FIG. 2a and FIG. 3 do not show the switching valve SV. The switching valve SV and the connected flow connections are shown in FIG. 1b and FIG. 2b as a hydraulic diagram in contrast to the other components. The switching valve SV in particular has two switch positions, namely the open position $SV_O$ and the closed position $SV_G$. In the open position $SV_O$, a pressurized fluid DF can flow back and forth between the annular fluid space RR and the first region $IR_{B1}$ through the switching valve SV without significant pressure losses. In the closed position $SV_G$, flow between the annular fluid space RR and the first region $IR_{B1}$ is prevented by the switching valve SV. The threaded nut 3 can then be held axially in position with the aid of the pressurized fluid DF, so that a hydraulic brake of the linear actuator 1 is formed by means of the switching valve SV and the pressurized fluid DF disposed in the annular fluid space RR and in the first region $IR_{B1}$.

A lubricating fluid for lubricating and/or cooling the screw drive 2 could be provided in the second region $IR_{B2}$ of the interior space IR, in which case then mixing of the lubricating fluid and the pressurized fluid DF is prevented, in particular by means of piston K.

To fluidically connect the first region $IR_{B1}$ and the annular fluid space RR, a first pressure relief valve $DBV_1$ is disposed between the first region $IR_{B1}$ and the annular fluid space RR in terms of flow parallel to the switching valve SV in such a way that the pressure that can be produced in the first region $IR_{B1}$ by means of a pressurized fluid DF can be limited upward in that the pressurized fluid DF can be conducted out of the first region $IR_{B1}$ into the annular fluid space RR via the first pressure relief valve $DBV_1$.

To fluidically connect the annular fluid space RR and the first region $IR_{B1}$, a second pressure relief valve $DBV_2$ is disposed between the annular fluid space RR and the first region $IR_{B1}$ in terms of flow parallel to the switching valve SV and in particular in terms of flow parallel to the first pressure relief valve $DBV_1$ in such a way that the pressure that can be produced in the annular fluid space RR by means of the pressurized fluid DF can be limited upward in that the pressurized fluid DF can be conducted out of the annular fluid space RR into the first region $IR_{B1}$ via the second pressure relief valve $DBV_2$.

The parallel connection of the switching valve SV, the first pressure relief valve $DBV_1$ and the second pressure relief valve $DBV_2$ means that, during operation of the linear actuator 1, substantially equal pressures prevail on the sides of these valves facing the annular fluid space RR. This parallel connection moreover also means that, during operation of the linear actuator 1, substantially equal pressures likewise prevail on the sides of these valves facing the first region $IR_{B1}$.

The switching valve SV, the first pressure relief valve $DBV_1$, and in particular the second pressure relief valve $DBV_2$, are embodied as a common structural unit with a common valve housing.

Such a common structural unit then comprises two connections, wherein one is connected to the first region $IR_{B1}$ and one is connected to the annular fluid space RR. The other fluidic connections to the valves are then implemented by means of flow channels configured in the valve housing.

A braking force which acts on the extension arm tube 3.a and the threaded nut 3 in the direction of an end of the extension arm tube 3.a facing away from the threaded spindle 4 can be produced by means of the first pressure relief valve $DBV_1$ as a function of the flow resistance of the first pressure relief valve $DBV_1$.

If this braking force produced by means of the first pressure relief valve $DBV_1$ during operation of the linear actuator 1 is greater than force otherwise acting on the extension arm tube 3.a and the threaded nut 3, the threaded nut 3 is held in position by means of the braking force; i.e. a length of the linear actuator 1 does not change. Such other forces can be applied to the linear actuator 1 from the outside, e.g. via moving bodies coupled to the linear actuator and associated loads, or theoretically also by means of the motor EM. Preferably, however, the motor EM is not operated against the braking force.

A braking force which acts on the extension arm tube 3.a and the threaded nut 3 in the direction of an end of the threaded spindle 4 facing away from the piston K can be produced by means of the second pressure relief valve $DBV_2$ as a function of the flow resistance of the second pressure relief valve $DBV_2$.

If this braking force produced by means of the second pressure relief valve $DBV_2$ during operation of the linear actuator 1 is greater than force otherwise acting on the extension arm tube 3.a and the threaded nut 3, the threaded nut 3 is held in position by means of this braking force; i.e. a length of the linear actuator 1 does not change.

The first region $IR_{B1}$ of the interior space IR of the extension arm tube 3.a is optionally connected to a pressure accumulator P in order to be able to produce a specific relief pressure in the first region $IR_{B1}$ by means of the pressure accumulator P.

A first shut-off valve $AV_1$ is then disposed fluidically between the first region $IR_{B1}$ and the pressure accumulator P.

The pressure accumulator can be embodied in a variety of ways. When the extension arm tube 3a retracts, the pressurized fluid DF flows from the first region $IR_{B1}$ to the pressure accumulator P when the first shut-off valve $AV_1$ is open to the pressure accumulator P. When the extension arm tube 3a extends, the pressurized fluid DF flows from the pressure accumulator P to the first region $IR_{B1}$ when the first shut-off valve $AV_1$ is open to the pressure accumulator P. The pressure accumulator P in particular makes it possible to produce a constant relief pressure in the first region $IR_{B1}$.

The annular fluid space RR can optionally be pressurized, preferably by means of a pressure source DQ.

A second shut-off valve $AV_2$ is then disposed fluidically between the annular fluid space RR and the pressure source DQ.

The pressure source DQ is connected to an outer perimeter of the housing G adjacent to the annular fluid space RR. The pressure source DQ can be embodied in a variety of ways, for example also as a further pressure accumulator. When the annular piston RK retracts, the pressurized fluid DF flows from the pressure source DQ to the annular fluid space RR when the second shut-off valve $AV_2$ is open to the pressure source DQ. When the annular piston RK extends, the pressurized fluid DF flows from the annular fluid space RR to the pressure source DQ when the second shut-off valve $AV_2$ is open to the pressure source DQ. The pressure source DQ can be in particular used to produce a constant pressure in the annular fluid space RR. The pressure source DQ and the pressure accumulator P can be fluidically coupled to one another via the first shut-off valve $AV_1$, the switching valve SV and the second shut-off valve $AV_2$. Such a coupling is avoided in normal operation, but, over a longer period of operation, the fundamental possibility leads to pressurized fluid DF from the pressure source DQ mixing with pressurized fluid DF from the pressure accumulator P.

Since their use is optional, the pressure accumulator P, the pressure source DQ, the first shut-off valve $AV_1$ and the second shut-off valve $AV_2$ are shown with dashed lines.

The linear actuator 1 can be held in position as described above so that the length of the linear actuator 1 does not change. The linear actuator 1 can moreover be operated in the following four quadrants:
  in a first quadrant, the extension arm tube 3a is moved out of the housing G against a force F which acts on the extension arm tube 3a toward the housing G by means of energy provided by the motor EM;
  in a second quadrant, the extension arm tube 3a is moved into the housing G by means of a force F which acts on the extension arm tube 3a toward the housing G, while energy can be recuperated by means of the motor EM;
  in a third quadrant, the extension arm tube 3a is moved into the housing G against a force F which acts on the extension arm tube 3a away from the housing G by means of energy provided by the motor EM;
  in a fourth quadrant, the extension arm tube 3a is moved out of the housing G by means of a force F which acts on the extension arm tube 3a away from the housing G, while energy can be recuperated by means of the motor EM.

The first region $IR_{B1}$ can be pressurized with relief pressure by means of the pressure accumulator P and a control device ST of the linear actuator 1 during operation of the linear actuator 1 in the first and the second quadrant in order to reduce a contact force which acts between the threaded spindle 4 and the threaded nut 3. In the first quadrant, the first shut-off valve $AV_1$ is used to ensure that the first pressure relief valve $DBV_1$ is not also pressurized with relief pressure by means of the pressure accumulator P; i.e. a fluidic connection between the first region $IR_{B1}$ and the first pressure relief valve $DBV_1$ is interrupted. Likewise, in the second quadrant, the first shut-off valve $AV_1$ could be used to ensure that the first pressure relief valve $DBV_1$ is not also pressurized with relief pressure by means of the pressure accumulator P; i.e. a fluidic connection between the first region $IR_{B1}$ and the first pressure relief valve $DBV_1$ is interrupted. In the second quadrant, however, it is also conceivable that the first pressure relief valve $DBV_1$ is pressurized with relief pressure by means of the pressure accumulator P as well, i.e. the fluidic connection between the first region $IR_{B1}$ and the first pressure relief valve $DBV_1$ is enabled when the switching valve SV is closed, so that, when retracting, the threaded nut 3 and the extension arm tube 3a are braked by means of the first pressure relief valve $DBV_1$ and at the same time the contact force which acts between the threaded spindle 4 and the threaded nut 3 is reduced.

For this purpose, the control device ST is accordingly coupled to the pressure accumulator P, the switching valve SV and the first shut-off valve $AV_1$. The motor EM, which is preferably embodied as an electric motor, is also coupled to the control device ST for control and/or regulation of said Motor. In the first and fourth quadrants, the motor EM and thus the threaded spindle 4 rotate in the same rotation direction.

During operation of the linear actuator 1 in the third and fourth quadrants, the annular fluid space RR can be pressurized by means of the control device ST, and preferably by means of the pressure source DQ, in order to reduce the contact force which acts between the threaded spindle 4 and the threaded nut 3.

In the third quadrant, the second shut-off valve $AV_2$ is used to ensure that the second pressure relief valve $DBV_2$ is not also pressurized by means of the pressure source DQ; i.e. a fluidic connection between the annular fluid space RR and the second pressure relief valve $DBV_2$ is interrupted. Likewise, in the fourth quadrant, the second shut-off valve $AV_2$ could be used to ensure that the second pressure relief valve $DBV_2$ is not also pressurized by means of the pressure source DQ; i.e. a fluidic connection between the annular fluid space RR and the second pressure relief valve $DBV_2$ is interrupted. In the fourth quadrant, however, it is also conceivable that the second pressure relief valve $DBV_2$ is pressurized by means of the pressure source DQ as well, i.e. the fluidic connection between the annular fluid space RR and the second pressure relief valve $DBV_2$ is enabled when the switching valve SV is closed, so that, when extending, the threaded nut 3 and the extension arm tube 3a are braked by means of the second pressure relief valve $DBV_2$ and at the same time the contact force which acts between the threaded spindle 4 and the threaded nut 3 is reduced.

For this purpose, the control device ST is furthermore accordingly coupled to the pressure source DQ and the second shut-off valve $AV_2$. In the second and third quadrants, the motor EM and thus the threaded spindle 4 rotate in the same rotation direction, which is opposite to the rotation direction in the first and fourth quadrants, The first embodiment of the linear actuator 1 of FIGS. 1a and 1b comprises a damping element DM. The damping element DM is disposed on the end of the extension arm tube 3a facing away from the housing G and between the end of the extension arm tube 3a facing away from the housing G and a ball joint KG for damping axial impacts. A joint center KGM of the ball joint KG coincides with the longitudinal axis of the threaded spindle 4.

In FIG. 1a and 1b, the end of the extension arm tube 3a facing away from the housing G is fixedly connected to a support element AE which leads past the damping element DM or comprises such a support element AE. The support element AE comprises a sliding block GL, which is mounted such that it can move in longitudinal direction 1 and is provided for receiving a bolt BZ which passes through a joint head KGK of the ball joint KG, so that the extension arm tube 3a can be supported on the bolt BZ with respect to a rotation about the longitudinal axis of the threaded spindle 4.

The second embodiment example of the linear actuator 1 shown in FIGS. 2a and 2b likewise comprises a ball joint KG disposed on the end of the extension arm tube 3a facing away from the housing G and an associated support element AE. In FIGS. 2a and 2b as well, the support element AE comprises a sliding block GL, which is mounted such that it can move in longitudinal direction 1 and is provided for receiving a bolt BZ which passes through a joint head KGK of the ball joint KG, so that the extension arm tube 3a can be supported on the bolt BZ with respect to a rotation about the longitudinal axis of the threaded spindle 4. Since no or only very small movements of the bolt BZ in longitudinal direction of the linear actuator 1 are to be expected due to the lack of a damping element, the sliding block GL could also be omitted in the second embodiment example of the linear actuator 1.

The threaded spindle 4 is coupled to a hollow shaft EM.h of the motor EM embodied as an electric motor via a rotationally fixed connection 5.

Due to the rigid design, the rotating assembly consisting of the threaded spindle 4, the rotationally fixed connection 5 and the hollow shaft EM.h can be mounted with only two mounting points, namely a first pivot bearing L1 and a second pivot bearing L2.

A rotary encoder 6 is disposed on an end face of the threaded spindle 4 facing away from the extension arm tube 3a, namely at the second end $4._{E2}$ of the threaded spindle 4.

The rotary encoder 6 is preferably embodied as an absolute rotary encoder. This makes it possible to determine the position of the extension arm tube 3a without a travel measuring system.

In a maximally retracted state of the extension arm tube 3.a, the threaded nut 3 of FIG. 1b and 2b is preferably disposed at least partly completely inside the hollow shaft EM.h.

FIGS. 1b and 2b show the threaded nut 3 adjacent to the hollow shaft EM.h, but also not in the maximally retracted state. The threaded nut 3 could be moved even further to the left in accordance with the position shown in FIGS. 1b and 2b by a corresponding further rotation of the threaded spindle 4.

Figure 3:
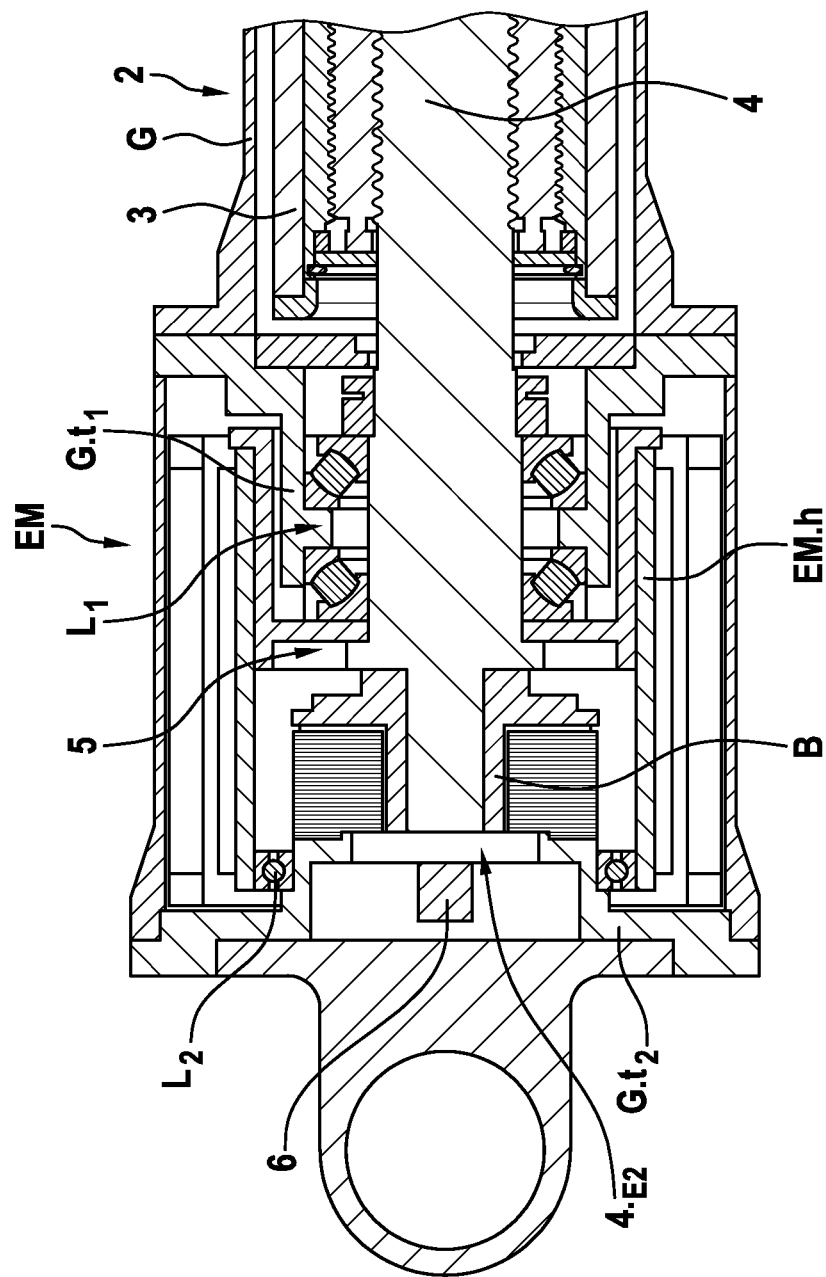
FIG. 3 shows a schematic sectional view of a further embodiment of a mounting of an electric motor and sections of the screw drive of the linear actuator.

FIG. 3 shows a schematic sectional view of a further embodiment of a mounting of an electric motor EM and sections of the screw drive 2 of the linear actuator 1. The omitted components can be taken analogously from the first and the second embodiment examples of the linear actuator 1.

In FIG. 3, an additional, preferably mechanical, holding brake B for the threaded spindle 4 and the first pivot bearing L1 for mounting the threaded spindle 4 on the housing G of the linear actuator 1 are disposed inside the hollow shaft EM.h. In FIGS. 1b and 2b, on the other hand, the first pivot bearing L1 is disposed laterally adjacent to the hollow shaft EM.h.

A length of the linear actuator 1 in the maximally retracted state is minimized in that the holding brake B and the first pivot bearing L1 are disposed inside the hollow shaft EM.h.

In FIG. 3, the housing G comprises a first hollow carrier G.t1, which projects into the hollow shaft EM.h of the electric motor EM and the inner perimeter of which serves to receive the first pivot bearing L1 disposed on the outer perimeter of the threaded spindle 4.

In FIG. 3, a second pivot bearing L2 is disposed between the outer perimeter of a second hollow carrier $G._{t2}$ of the housing G which projects into the hollow shaft EM.h of the electric motor EM and the inner perimeter of the hollow shaft EM.h in an end region of the electric motor EM facing away from the extension arm tube 3a. In FIGS. 1b and 2b, on the other hand, the second pivot bearing L2 is disposed on the outer perimeter of the hollow shaft EM.h.

The first pivot bearing L1 preferably comprises two tapered roller bearings in an O-arrangement. The second pivot bearing L2 comprises a radial deep groove ball bearing. The first pivot bearing L1 is configured as a fixed bearing, and the second pivot bearing L2 is configured as a floating bearing.

It is conceivable that a hydraulically effective surface of the annular fluid space RR is not the same size as the hydraulically effective surface of the first region $IR_{B1}$, and the first region $IR_{B1}$ and the annular fluid space RR can then be fluidically connected to one another via a reservoir by means of a switching valve SV having an open and a closed position, which is not shown in the figures for the sake of clarity. The switching valve SV is in particular configured such that the reservoir can only be pressurized with pressurized fluid DF when the switching valve SV is in the open position SVO.

LIST OF REFERENCE SIGNS

1 Linear Actuator
2 Screw drive
3 Threaded nut
3.a extension arm tube
4 Threaded spindle
$4._{E1}$ First end of the threaded spindle 4
$4._{E2}$ Second end of the threaded spindle 4
5 Rotationally fixed connection
6 Rotary encoder
EM Electric motor
EM.h Hollow shaft
K Piston
IR Interior space
$IR_{B1}$ First region of the interior space IR
$IR_{B2}$ Second region of the interior space IR
P Pressure accumulator
RK Annular piston
G Housing
RR Annular fluid space
DQ Pressure source
SV Switching valve
$SV_O$ Open position of the switching valve SV
$SV_G$ Closed position of switching valve SV
$DBV_1$ First pressure relief valve
$DBV_2$ Second pressure relief valve
$AV_1$ First shut-off valve
$AV_2$ Second shut-off valve
DF Pressurized fluid
ST Control device
DM Damping element
KG Ball joint
$KG_M$ Joint center
$KG_K$ Joint head
AE Support element
GL Sliding block
BZ Bolt
B Holding brake
$L_1$ First pivot bearing
$L_2$ Second pivot bearing
$G.t_1$ First hollow carrier
$G.t_2$ Second hollow carrier
I Longitudinal direction

What is claimed is:

1. A linear actuator, comprising:
   a screw drive which comprises (i) a threaded nut connected to an extension arm tube and (ii) a threaded spindle that is couplable to a motor for torque transmission such that the threaded nut and the extension arm tube are moved in a linear manner by a rotation of the threaded spindle and, regardless of the position the extension arm tube, a first end of the threaded spindle projects into the extension arm tube and is connected to a piston which partitions an interior space formed by the extension arm tube into a first region on a side of the piston opposite to the threaded nut and a second region on a side of the piston facing the threaded nut such that the first and the second region are separated from one another in a fluid-tight manner,
   wherein:
   the threaded nut is embodied as or comprises a fluid-tight annular piston that delimits an annular fluid space which is configured between a housing of the linear actuator and the extension arm tube in a fluid-tight manner, and a hydraulically effective surface of the fluid-tight annular piston is the same size as a hydraulically effective surface of the first region, and
   the first region and the annular fluid space are configured to be fluidically connected to one another by a switching valve having an open position and a closed position.

2. The linear actuator according to claim 1, wherein, a first pressure relief valve is disposed between the first region and the annular fluid space in terms of flow parallel to the switching valve to fluidically connect the first region and the annular fluid space, such that a pressure produced in the first region by a pressurized fluid is limited upward in that the pressurized fluid is conducted out of the first region into the annular fluid space via the first pressure relief valve.

3. The linear actuator according to claim 2, wherein, to fluidically connect the annular fluid space and the first region, a second pressure relief valve is disposed between the annular fluid space and the first region in terms of flow parallel to the switching valve and in terms of flow parallel to the first pressure relief valve such that a pressure produced in the annular fluid space by the pressurized fluid is limited upward in that the pressurized fluid is conducted out of the annular fluid space into the first region via the second pressure relief valve.

4. The linear actuator according to claim 3, wherein the switching valve, the first pressure relief valve, and the second pressure relief valve are embodied as a common structural unit with a common valve housing.

5. The linear actuator according to claim 2, wherein a braking force, which acts on the extension arm tube and the threaded nut in a direction of an end of the extension arm tube facing away from the threaded spindle, is produced by the first pressure relief valve as a function of a flow resistance of the first pressure relief valve.

6. The linear actuator according to claim 3, wherein a braking force, which acts on the extension arm tube and the threaded nut in a direction of an end of the threaded spindle facing away from the piston, is produced by the second pressure relief valve as a function of a flow resistance of the second pressure relief valve.

7. The linear actuator according to claim 1, wherein the first region of the interior space of the extension arm tube is connected to a pressure accumulator so as to produce a specific relief pressure in the first region by said pressure accumulator.

8. The linear actuator according to claim 7, wherein a first shut-off valve is disposed fluidically between the first region and the pressure accumulator.

9. The linear actuator according to claim 1, wherein the annular fluid space is configured to be pressurized by a pressure source.

10. The linear actuator according to claim 9, wherein a second shut-off valve is disposed fluidically between the annular fluid space and the pressure source.

* * * * *